United States Patent [19]

Mickey

[11] 4,418,934
[45] Dec. 6, 1983

[54] PIVOTAL BOLSTER PLATE

[75] Inventor: Carl F. Mickey, High Point, N.C.

[73] Assignee: W. F. Mickey Body Company, Inc., High Point, N.C.

[21] Appl. No.: 365,954

[22] Filed: Apr. 6, 1982

[51] Int. Cl.$^3$ .............................................. B62D 53/08
[52] U.S. Cl. ................................. 280/438 R; 280/433; 280/492
[58] Field of Search ....... 280/438 RA, 438 A, 423 R, 280/433, 492

[56] References Cited

U.S. PATENT DOCUMENTS

| 3,021,155 | 2/1962 | Sherman, Jr. | 280/438 R |
| 3,337,277 | 8/1967 | Arnold | 280/433 |
| 3,430,987 | 3/1969 | Whitmore et al. | 280/438 R |
| 3,897,086 | 7/1975 | Breford | 280/438 R |
| 3,899,194 | 8/1975 | Breford | 280/438 R |

Primary Examiner—Joseph F. Peters, Jr.
Assistant Examiner—Donn McGiehan
Attorney, Agent, or Firm—Anthony A. O'Brien

[57] ABSTRACT

A bolster plate is mounted on the bottom side of a shaft which is supported longitudinally on the trailer for permitting pivotal movement of the bolster plate about the axis of the shaft. The shaft is mounted at its opposite ends by thrust bearings on longitudinal support of the trailer and is engaged on its upper side at the center by a half round groove-like bearing surface of a center bearing which is mounted on the support.

8 Claims, 7 Drawing Figures

PIVOTAL BOLSTER PLATE

TECHNICAL FIELD

The present invention relates to connecting mechanism for joining a trailer to a tractor, and particularly to a mounting structure for supporting a bolster plate for pivotal movement about an axis extending longitudinally to the trailer.

DESCRIPTION OF THE PRIOR ART

In operation of vehicles employing a tractor pulling a trailer, relative movement of a tractor about an axis extending longitudinally relative to the trailer length results in torsion being applied through the fifth wheel connection to the trailer often resulting in deformation of the trailer. The prior art, as exemplified in U.S. Pat. Nos. 2,618,488, 3,464,719, and 4,017,095 contains a number of arrangements for producing pivotal movement of the fifth wheel on the tractor, and as exemplified in U.S. Pat. Nos. 3,430,987, 3,881,749, 3,897,086 and 3,899,194 contains a number of pivotal mounting structures on trailers. Generally these prior art arrangements have one or more deficiencies such as being unduly expensive, failing to provide adequate support, being difficult to install, etc.

SUMMARY OF THE INVENTION

The invention is summarized in a pivotal mounting for a bolster plate on a trailer which has an elongated support extending longitudinally in the center of a bottom of a forward portion of the trailer, the mounting including a shaft extending parallel to the trailer support, a pair of thrust bearings mounted on a support and rotatably supporting opposite ends of the shaft, a bolster plate secured to the shaft on the bottom side of the shaft, a king pin mounted on the bolster plate, and a center bearing mounted on the support and having bottom groove-like bearing means engaging a center portion of the shaft on the upper side of the shaft.

An object of the invention is to construct a pivotal mounting for a bolster plate on a trailer wherein the mounting is relatively simple and inexpensive as well as easy to install.

Another object of the invention is to provide a longitudinal pivotal mounting for a bolster plate which provides adequate strength for connecting a trailer to a tractor.

One advantage of the invention is that a pivotal shaft secured to a bolster plate is engaged by a groove-like bearing surface on its upper side to substantially prevent bending of the shaft by weight of the trailer.

Other objects, advantages and features of the invention will be apparent from the following description of the preferred embodiments taken in conjunction with the accompanying drawings.

DESCRIPTION OF THE PREFERRED EMBODIMENT

Figure 1:
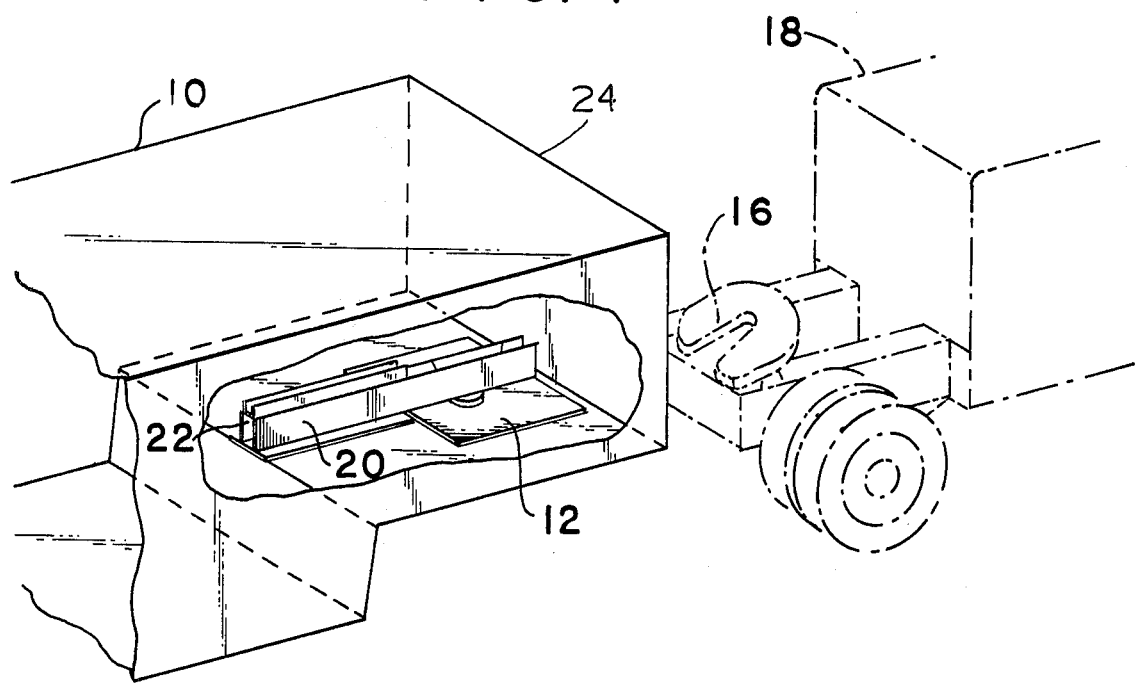
FIG. 1 is a perspective view taken from a right rear upper corner of a front portion of a trailer, with a tractor portion illustrated in long and short dashed lines, including a pivotal bolster plate in accordance with the invention.
Figure 4:
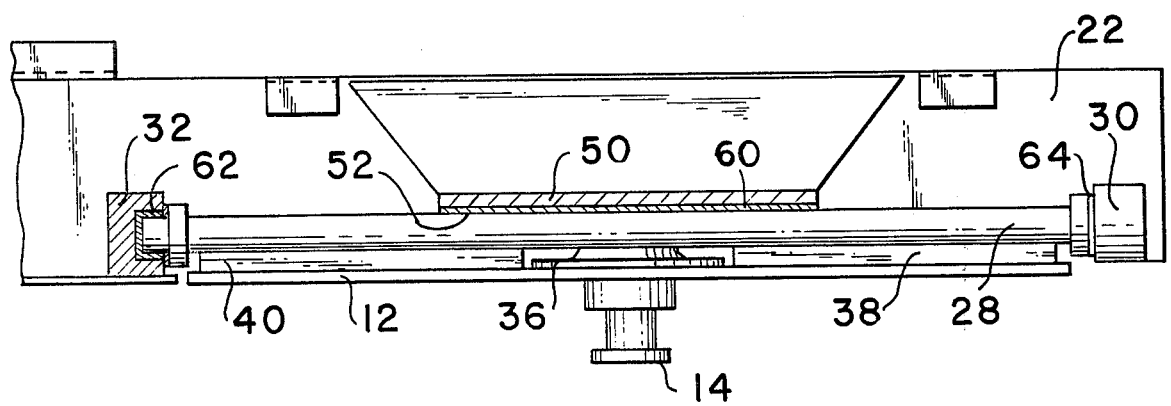
FIG. 4 is a longitudinal section view taken at line 4—4 in FIG. 3.
Figure 5:
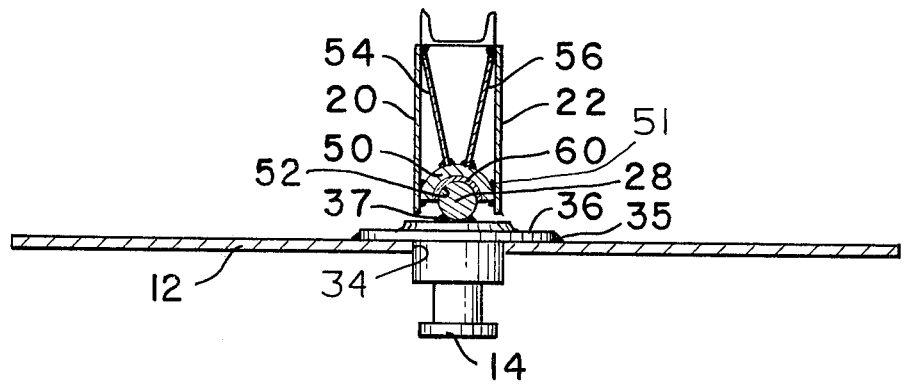
FIG. 5 is a section view taken at line 5—5 in FIG. 3.

As illustrated in FIG. 1, the invention is embodied in a trailer 10 having an oscillating or pivotal bolster plate 12 which as shown in FIGS. 4 and 5 includes a king pin 14 projecting downward from the center of the plate 12 for being slidably and rotatably engaged by a fifth wheel 16 of a tractor 18. The tractor and the fifth wheel 16 are a conventional design. The trailer 10 has a longitudinal forward support including support members 20 and 22 which extend in a direction parallel to the longitudinal dimension of the trailer centrally between the sides thereof and in the bottom of a forward portion 24 of the trailer 10. The bolster plate 12 is pivotally mounted on the support members 20 and 22 for limited pivotal movement about an axis extending parallel to the members 20 and 22 to prevent torsion being applied to the trailer 10 by relative twisting movement of the tractor 18 about the longitudinal axis.

Figure 2:
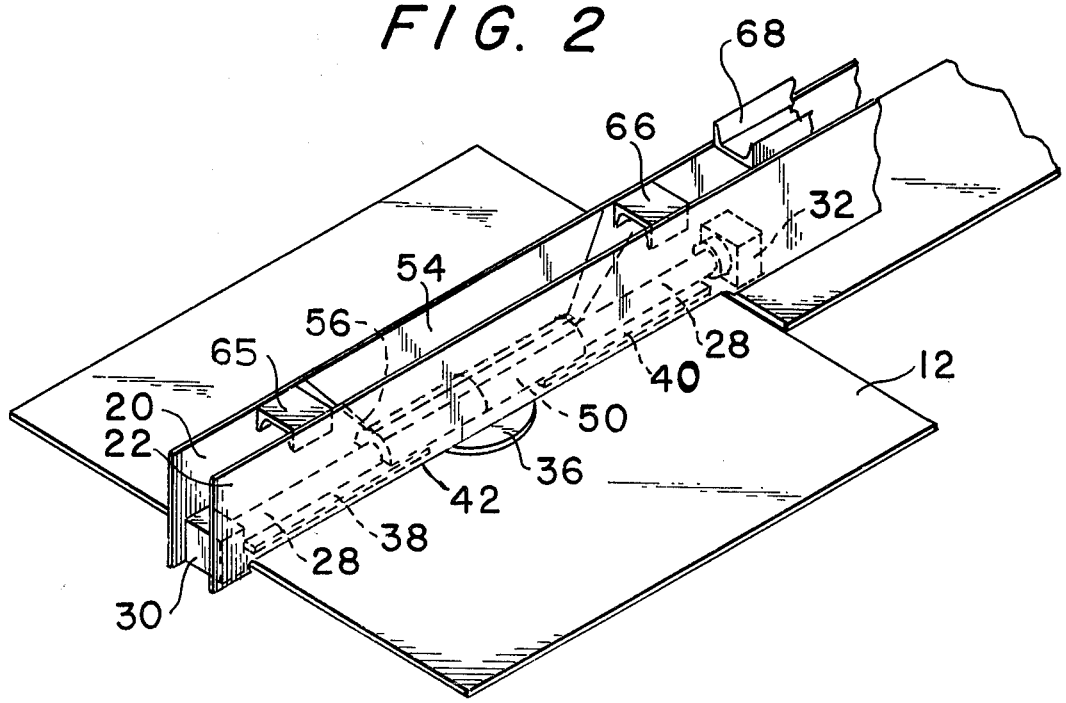
FIG. 2 is a perspective view taken from a left front upper corner of a bolster plate mounting arrangement broken away from the trailer of FIG. 1.
Figure 3:
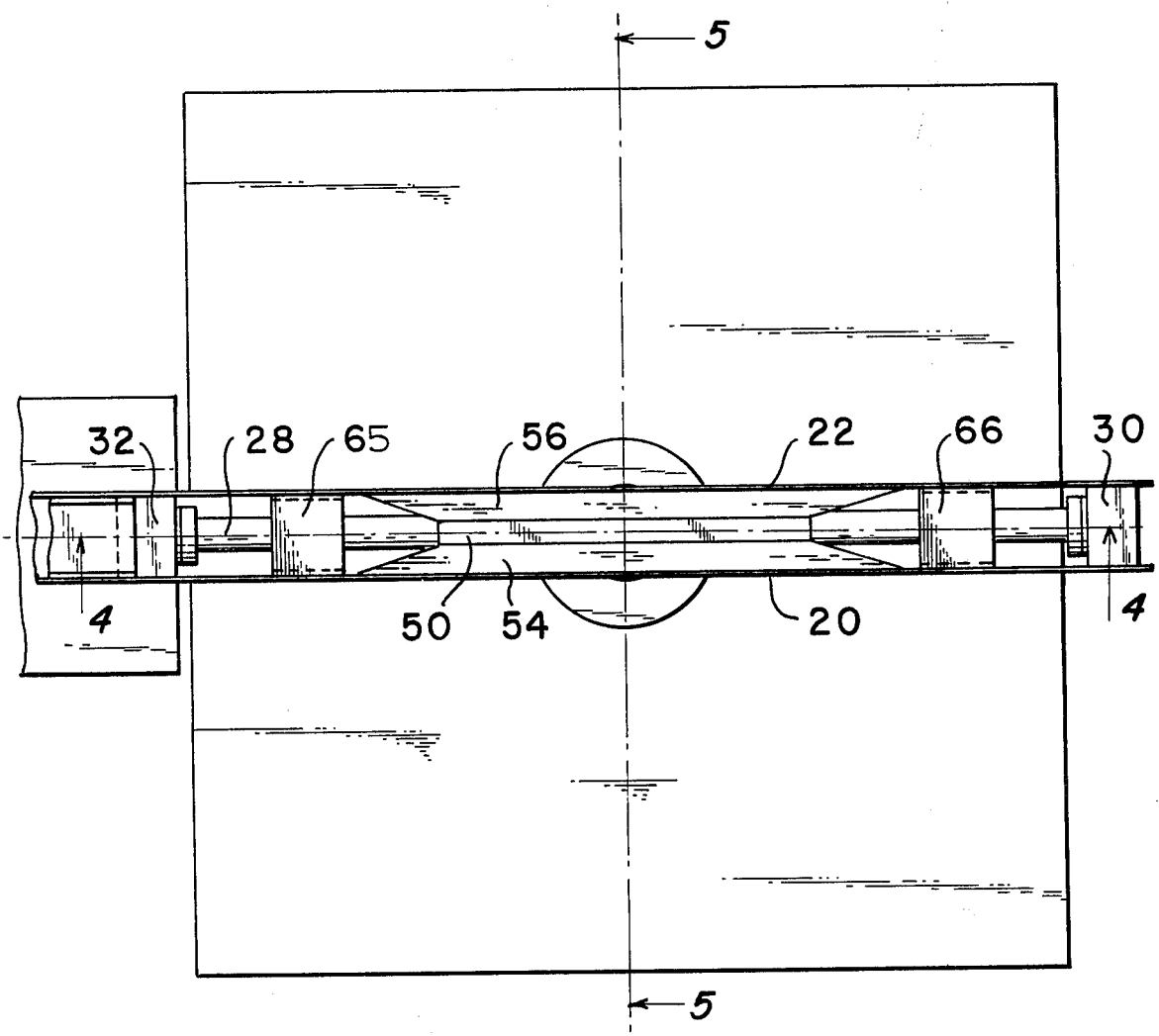
FIG. 3 is a top view of the bolster plate arrangement of FIG. 2.

The pivotal mounting of the bolster plate 12, as shown in FIGS. 2–5, includes a shaft 28 which has its opposite ends rotatably supported by thrust bearings 30 and 32 mounted between forward parallel plate-like portions of the support members 20 and 22. The thrust bearings 30 and 32 are designed to permit rotative movement of the shaft about its axis but to otherwise prevent movement of the shaft 28 relative to the trailer. The king pin 14 extends through an opening 34 formed in the center of the bolster plate 12 and has an upper flange 36 which is secured on the top side of the bolster plate 12, for example, by weld 35. The bolster plate 12 is secured to the bottom side of the shaft 28 by welds 37 extending on the flange 36, and by spacer bars 38 and 40 between the plate 12 and the shaft 28; the spacer bars 38 and 40 being welded both to the underside of the shaft 28 and to the top side of the plate 12. Cutaways 42 are formed in the lower portions of the members 20 and 22 over the plate 12 to permit limited rotating movement of the plate 12. A center bearing 50 which, as shown in FIG. 2, may be formed in two parts, is mounted between the support members 20 and 22, for example, by welds 51 between opposite sides of the support members 20 and 22 and the bearing 50. The bearing 50 extends over a central portion of the shaft 28 and has a half-round groove-like bearing surface 52 engaging the upper side of the central portion of the shaft 28. Trapezoidal bracing plates 54 and 56 extend from the upper side of the center bearing 50 upward and outward to the support members 20 and 22. The shorter of the parallel edges of the plates 54 and 56 are welded to the top side of the bearing 50 while the longer of the parallel sides are welded to the support members 20 and 22. The center half bearing 50 as well as the thrust bearings 30 and 32 may include brass bushings 60, 62 and 64, respectively. Additionally, conventional lubricating means (not shown) may be provided for the bearings 30, 32 and 50. The support members 20 and 22 are additionally provided with bracing or reinforcing members 65, 66 and 68.

In operation of the pivoted bolster plate 12 of FIGS. 2-5, the pulling or pushing forces of the tractor are applied through the king pin 14 and the shaft 28 and bearings 30 and 32 to the support members 20 and 22. Twisting movement of the tractor 18 longitudinally relative to the trailer 10 results in the shaft 28 rotating in the thrust bearings 30 and 32 to prevent torsion being applied to the support members 20 and 22. The half bearing 50 provides support for the center portion of the shaft 28 preventing the shaft from being bent by the weight of the trailer 10 and preventing the bearings 20 and 22 from being broken free by the constant jarring movement of bumps and uneven roadways. The trapezoidal plates 54 and 56 substantially reinforce the mounting of the bearing 50 in the support members 20 and 22. The longitudinally pivotal mounting structure for the bolster plate with its half bearing 50 is relatively inexpensive and easy to assemble.

Figure 6:
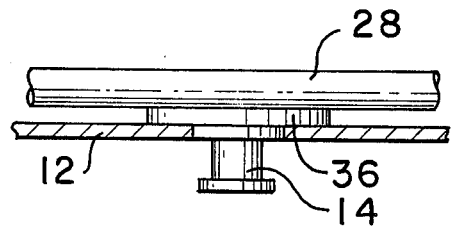
FIG. 6 is a longitudinal section view of a modification of the bolster plate support arrangement.
Figure 7:
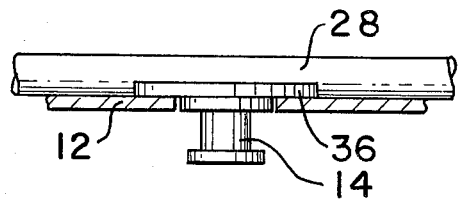
FIG. 7 is a longitudinal section view of a second modification of the bolster plate support arrangement.

In FIG. 6, there is shown a modification wherein the spacer bars 38 and 40 of FIG. 4 are left out, the bolster plate 12 and king pin 14 being mounted on the shaft 28 by the welding of the flange 36 to the bottom side of the shaft 28. In FIG. 7 a modification is shown wherein the bottom of the shaft 28 has a cutout 80 formed therein for receiving the flange 36 of the king pin 14. The modification of FIG. 7 permits the shaft 28 to be welded directly to the plate 12 without spacer bars.

Since the above described embodiment is subject to many modifications, variations and changes in detail, it is intended that all matter in the foregoing description and shown in the accompanying drawings be interpreted as illustrative and not in a limiting sense.

What is claimed is:

1. A pivotal mounting for a bolster plate on a trailer which has an elongated support extending longitudinally in the center of a bottom of a forward portion of the trailer, the mounting comprising
a shaft extending parallel to the trailer support,
a pair of thrust bearings mounted on the support and rotatably supporting opposite ends of the shaft,
a bolster plate secured for rotation with the shaft on the bottom side of the shaft,
a king pin mounted on the bolster plate, and
a center bearing mounted on the support and having bottom groove-like bearing means engaging a center portion of the shaft on the upper side of the shaft.

2. A pivotal mounting as claimed in claim 1 wherein the center bearing is elongated and extends longitudinally along the shaft, and the bottom groove-like bearing means includes a half-round groove-like bearing surface extending longitudinally in the bottom of the center bearing.

3. A pivotal mounting as claimed in claim 2 wherein the trailer support includes a pair of spaced plate-like portions and the center bearing is secured on opposite sides to the plate-like portions.

4. A pivotal mounting as claimed in claim 3 including a pair of bracing plates extending upward from an upper surface of the center bearing and extending outward to interior surfaces of the plate-like portions of the support, said bracing plates being secured at bottom edges thereof to the center bearing and being secured at upper edges thereof to the plate-like portions of the support.

5. A pivotal mounting as claimed in claim 4 wherein the bracing plates are trapezoidal with the bottom edges being the shorter edges of the parallel edges and with the upper edges being the longer edges of the parallel edges.

6. A pivotal mounting as claimed in claim 1 or 5 wherein the horizontal plate includes a center opening, the king pin extends downward through the opening and has an upper flange secured on the upper side of the horizontal plate.

7. A pivotal mounting as claimed in claim 6 including a pair of spacing bars extending between and secured to both the shaft and the horizontal plate in front and behind the king pin flange.

8. A pivotal mounting as claimed in claim 6 wherein the shaft includes a cutout in the bottom side thereof receiving the king pin flange.

* * * * *